United States Patent
Samadani et al.

(10) Patent No.: US 7,423,696 B2
(45) Date of Patent: Sep. 9, 2008

(54) CONCURRENT LUMINANCE-SATURATION ADJUSTMENT OF DIGITAL IMAGES

(75) Inventors: Ramin Samadani, Menlo Park, CA (US); Guo Li, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 11/031,825

(22) Filed: Jan. 7, 2005

(65) Prior Publication Data

US 2006/0164556 A1 Jul. 27, 2006

(51) Int. Cl.
*H04N 9/68* (2006.01)
*H04N 9/67* (2006.01)
*G09G 5/02* (2006.01)

(52) U.S. Cl. .................. 348/645; 348/649; 345/604

(58) Field of Classification Search ........ 348/645–647, 348/708, 649–651, 242, 223.1, 255, 256; 382/162, 167; 358/520; 345/604, 589–591
See application file for complete search history.

(56) References Cited

U.S. PATENT DOCUMENTS

| | | | | |
|---|---|---|---|---|
| 5,343,220 A | * | 8/1994 | Veasy et al. | 715/702 |
| 5,696,839 A | * | 12/1997 | Siegeritz | 382/162 |
| 5,798,801 A | | 8/1998 | Skinner | |
| 5,818,613 A | * | 10/1998 | Masterson et al. | 358/520 |
| 5,867,169 A | * | 2/1999 | Prater | 345/604 |
| 5,937,177 A | * | 8/1999 | Molnar et al. | 712/200 |
| 5,943,143 A | * | 8/1999 | Kawai et al. | 358/520 |
| 5,995,655 A | * | 11/1999 | Lockett et al. | 382/162 |
| 6,154,217 A | * | 11/2000 | Aldrich | 345/589 |
| 6,337,692 B1 | * | 1/2002 | Rai et al. | 345/594 |
| 6,567,134 B1 | | 5/2003 | Morgan | |
| 6,771,311 B1 | | 8/2004 | Weldy | |
| 6,798,902 B1 | * | 9/2004 | McIntyre et al. | 382/167 |
| 6,823,083 B1 | * | 11/2004 | Watanabe et al. | 382/167 |

* cited by examiner

*Primary Examiner*—Victor R Kostak (57) ABSTRACT

Brightness of a plurality of pixels in a digital image is adjusted directly in a luminance-chrominance color space. Luminance and saturation are adjusted concurrently without changing hue of the pixels.

22 Claims, 6 Drawing Sheets

CONCURRENT LUMINANCE-SATURATION ADJUSTMENT OF DIGITAL IMAGES

BACKGROUND

Brightness adjustment can be desirable for images and videos that were gathered with non-ideal exposures. However, saturation can be adversely affected when the images and videos are lightened or darkened. Insufficient saturation can occur when dark colors are lightened and when light colors are darkened. In images with insufficient saturation, colors appear less lively and less vibrant. Over-saturation can occur when dark colors are darkened and when light colors are lightened. In oversaturated images, details become more difficult to discern.

It would be desirable to adjust the brightness without adversely affecting saturation.

It would also be desirable to increase the brightness directly in a luminance-chrominance space. Certain image rendering devices have digital imaging pipelines that work directly in luminance-chrominance space. Consider a luminance-chrominance digital television that has a pipeline for processing MPEG images, and printer having a pipeline for processing JPEG images. MPEG and JPEG images are based on luminance-chrominance color space. For these devices, adjusting brightness directly in luminance-chrominance space can be advantageous, because unnecessary color conversions are avoided. For example, a printer that adjusts brightness directly in luminance-chrominance space can avoid an extra conversion to another color space for lightness adjustment (e.g., RGB); and a luminance-chrominance digital television that adjusts brightness directly in luminance-chrominance space can avoid an extra conversion to another color space for lightness adjustment (e.g., RGB).

SUMMARY

According to one aspect of the present invention, brightness of a plurality of pixels in a digital image are adjusted directly in a luminance-chrominance color space. Luminance and saturation are adjusted concurrently without changing hue of the pixels.

Other aspects and advantages of the present invention will become apparent from the following detailed description, taken in conjunction with the accompanying drawings, illustrating by way of example the principles of the present invention.

DETAILED DESCRIPTION

As shown in the drawings for purposes of illustration, the present invention is embodied in a method, apparatus, and article for adjusting image brightness without adversely affecting saturation. The brightness adjustment is performed directly in luminance-chrominance space, which makes it especially desirable for imaging systems having pipelines that work in luminance-chrominance space. The brightness adjustment is not limited to any particular platform. The brightness adjustment could be performed by computers, printers, projectors and televisions. Some embodiments can be implemented efficiently in hardware, software, firmware and combinations thereof. The efficient implementation is particularly attractive to platforms having limited memory requirements and limited computational power.

Figure 1:
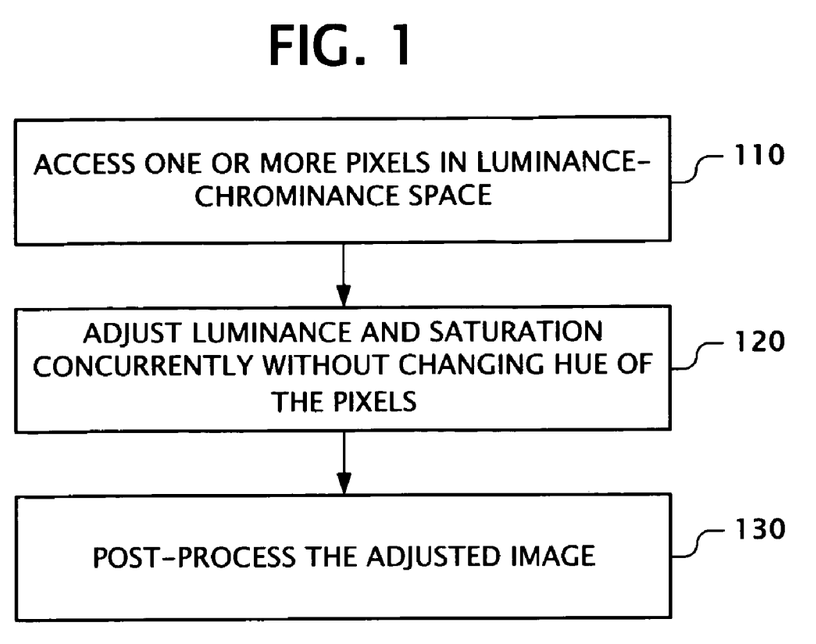
FIG. 1 is an illustration of a method of processing a digital image in accordance with an embodiment of the present invention.

Reference is made to FIG. 1, which illustrates a method of processing one or more pixels in a digital image. At block 110, one or more of the pixels are accessed. A single pixel may be accessed, or a group of pixels (e.g., a region of the image) may be accessed, or the entire image may be accessed. The accessed pixel(s) are in a color space that is generically referred to as a luminance-chrominance space. The luminance-chrominance space includes a luminance component and two color difference components. Examples of luminance-chrominance space include, without limitation, $YC_bC_r$ and CIELAB.

Figure 2:
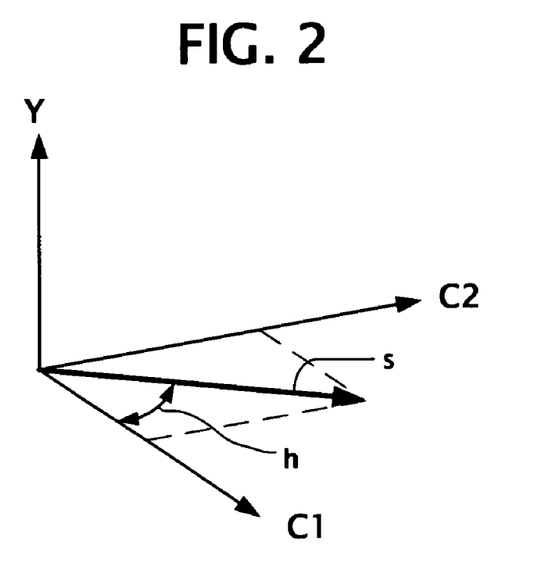
FIG. 2 is an illustration of luminance-chrominance color space.

Reference is made briefly to FIG. 2, which illustrates an exemplary luminance-chrominance space. Luminance is denoted by Y or L, and the first and second chrominance components are denoted by C1 and C2. The saturation (s) may be computed as $s=\sqrt{C1^2+C2^2}$; and the hue (h), which is the angle defined by the chrominance components, may be computed as $$h = \tan^{-1}\left(\frac{C2}{C1}\right).$$

Reference is once again made to FIG. 1. At block 120, brightness of the pixels is adjusted directly in the luminance-chrominance space. Adjusting the brightness includes adjusting luminance and saturation concurrently without changing hue of the pixels. The saturation is adjusted to compensate for the adjustment to the luminance component.

The adjustment may be applied globally to the entire image, or it may be applied adaptively in a local manner by processing on a pixel-by-pixel basis or on a region-by-region basis.

The adjustment of the luminance component of a pixel may follow the trajectory of a curve that correlates luminance to saturation. By following a curve trajectory, problems with under-saturation and over-saturation can be avoided while adjusting brightness.

The method is based on empirical observations of object color changes due to illumination variation. Color histograms of objects distribute along curves in YCbCr or CIELAB color spaces. These curves connect a black point, a saturated color point and a white point. Observed curves in different hue sectors correspond to individual objects in an image (e.g., skin tone of a person, blue color of a shirt, green color of a car). This phenomenon, due to complex factors including specular reflection, implies that an object of a uniform material will result in colors along a luminance-saturation curve as the intensity and the angle of the light source change. These observations can be generalized as follows: all colors may be modified by moving them along lightness-saturation curves while leaving their hue unchanged. For ease of modeling, it is assumed that different curves do not intersect (except at the white and black point). Thus, for a set of curves, one end of the curves connects at a white point, and the other end of the curves connects at a black point.

For each hue, the saturation is given by a function $s=q(L, t)$. The shape function $q(L, t)$ defines a set of curves of luminance, with a parameter t, where the curves are non-intersecting except at $L=0$ and $L=1$ (where the curves may coincide). In general, the curves nearer or further from the gray axis, $s=0$, may be of different shapes. An individual curve is determined by the parameter t. Thus, $q(L,t)$ defines a family of curves for a particular hue. Different families are possible for different hues. The parameter t is an index to a specific curve in a family.

Figure 3:
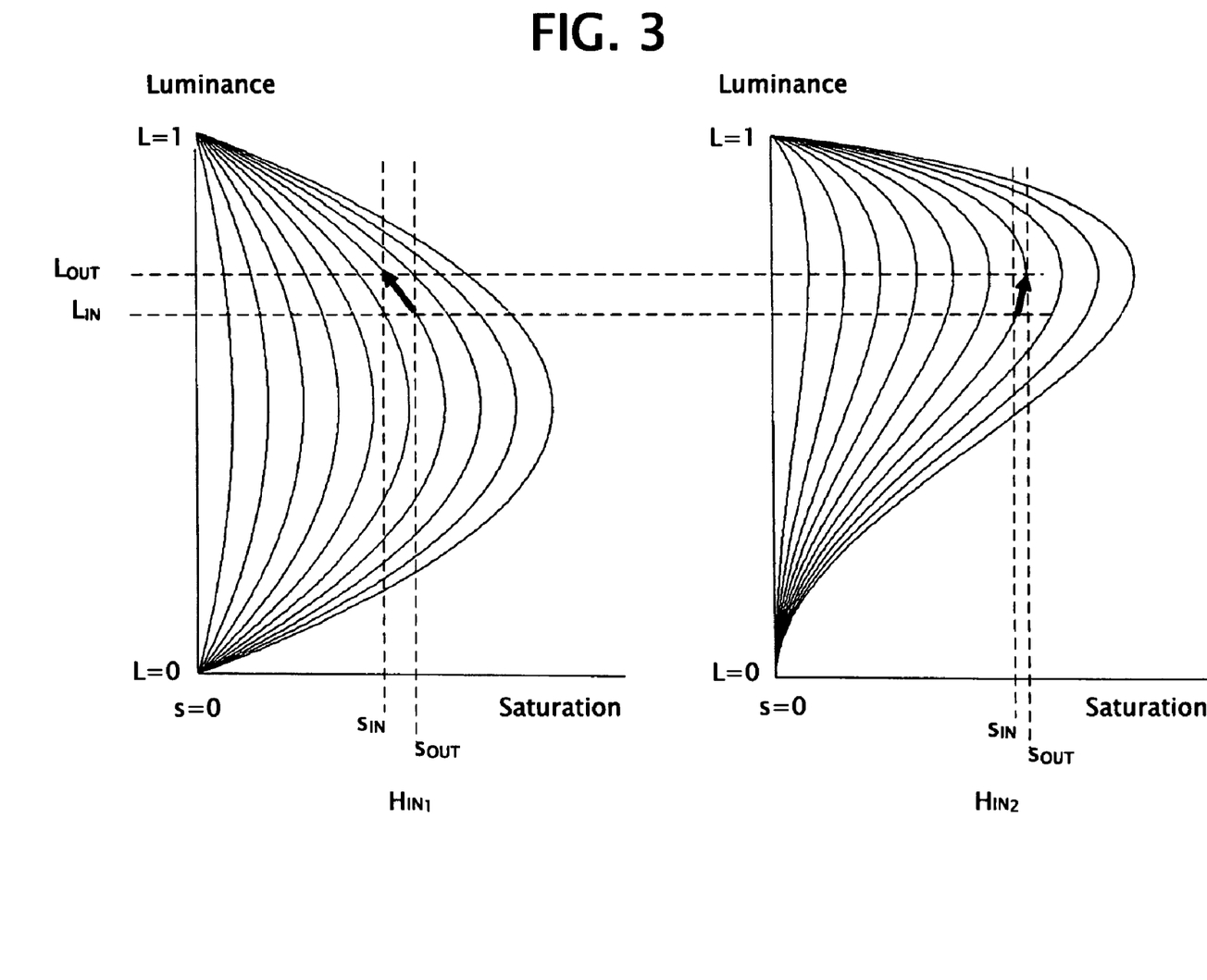
FIG. 3 is an illustration of curves for concurrently adjusting luminance and saturation.

Reference is made to FIG. 3, which illustrates two different families of curves for adjusting luminance and saturation concurrently, one for each of two different hues. A curve family is selected as a function of hue. The curves have different shapes for different hues. For example, the shapes could follow the general shape of the gamut of the luminance-chrominance space. The curve shape allows control over the saturation change as a function of hue because the gamut changes shape as a function of hue. By following the curves for lightness adjustment, out-of-gamut problems that occur with standard luminance-only adjustments are greatly minimized. In the cases where out-of-gamut colors occur, they usually are closer to the gamut surface, and they may be clipped to be in the gamut range in a traditional way.

These curves control how the saturation will be modified as a function of hue, since the color traversals are along the curves. The two arrows in FIG. 3 show two examples of how colors traverse from a starting point on the curves (the input colors) to the end points (the output colors).

Figure 4:
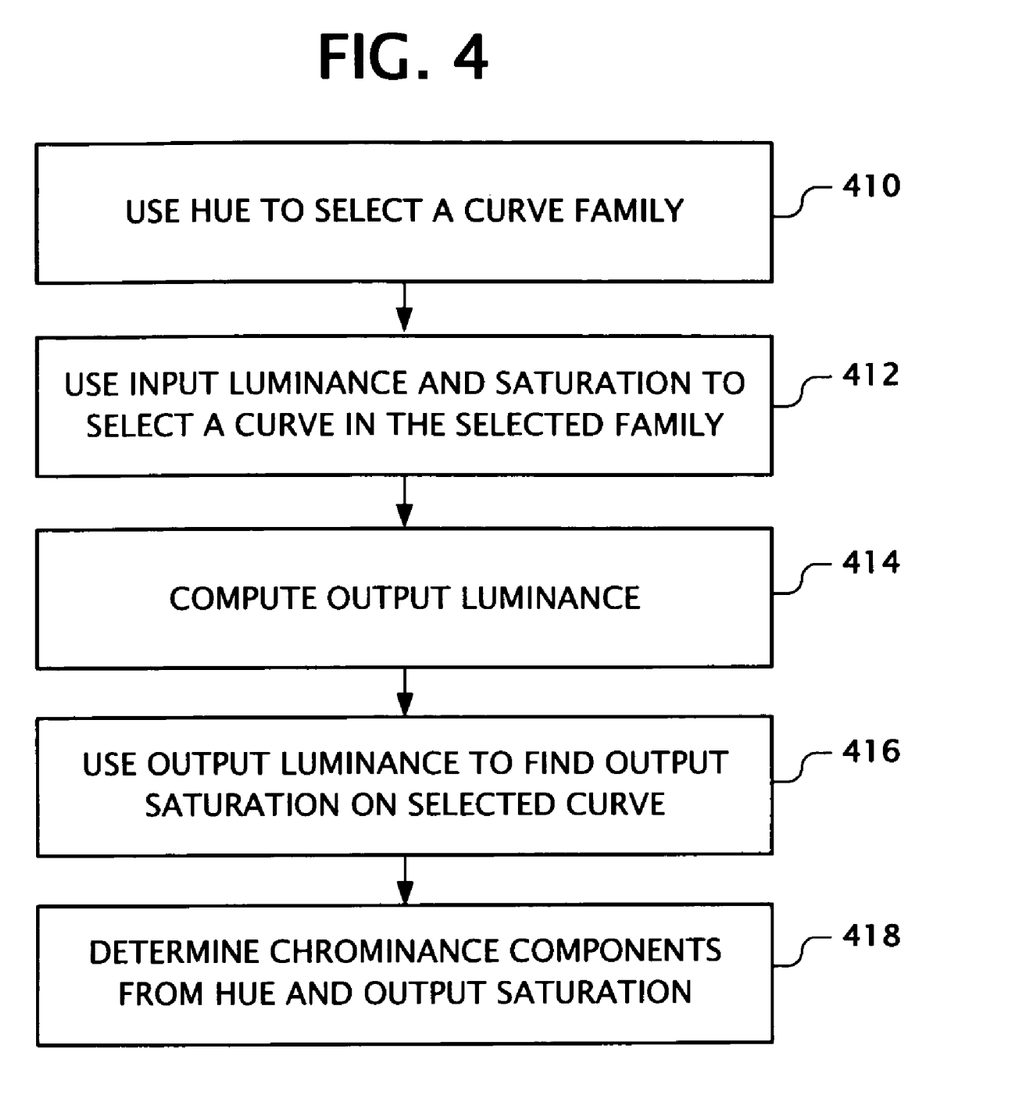
FIG. 4 is an illustration of a method of concurrently adjusting luminance and saturation according to an embodiment of the present invention.

Additional reference is now made to FIG. 4, which illustrates a method of using the families of curves. Starting with an input color ($L_{in}$, $C1_{in}$, $C2_{in}$), hue ($h_{in}$) is computed (e.g., $$h_{in} = \tan^{-1}\left(\frac{C2_{in}}{C1_{in}}\right))$$

and used to select a curve family (step 410). An input saturation ($s_{in}$) is computed (e.g., $s_{in}=\sqrt{C1_{in}^2+C2_{in}^2}$), and the input luminance and the input saturation are used to select a curve in the selected curve family (step 412). An output luminance ($L_{out}$) is computed (step 414), and used to identify the new (output) saturation ($s_{out}$) on the selected curve (step 416). The color components $C1_{out}$ and $C2_{out}$ of the output color can be computed from the hue ($h_{out}=h_{in}$) and the output saturation ($s_{out}$) (step 418).

The method of FIG. 4 can be simplified by using a discrete set of hues for which curve families are defined. If a point corresponding to the luminance and chrominance of the input pixel does not fall directly on one of these hues, the two hues nearest the input hue ($h_{in}$) can be selected. The adjusted luminance ($L_{out}$) can select two saturations ($s_{1out}$, $s_{2out}$) on the two selected curves (one saturation per hue), and the output saturation ($s_{out}$) can be interpolated from saturations $s_{1out}$ and $s_{2out}$.

Depending on implementation constraints, it may be desirable to use curve families that simplify the computation. For example, curve families based on a "separable" equation for saturation may be used to simply the computation. The separable equation for saturation may have the form $s=t*q(L)$. This separable equation allows curves scaled by a gain parameter, which are easy to compute with. In this case, the parameter t may be interpreted to represent a gain applied to the function $q(L)$.

Figure 5:
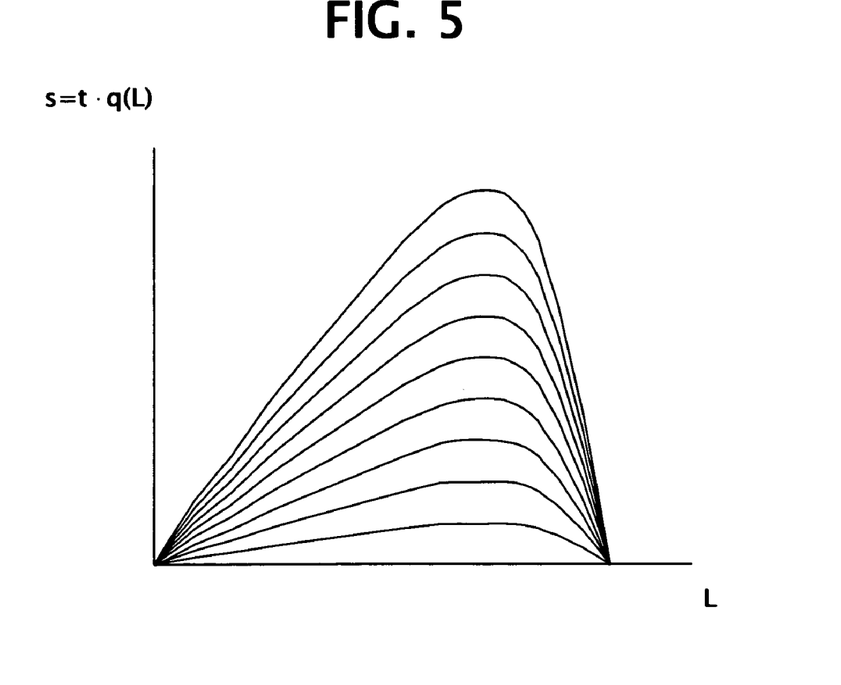
FIG. 5 is an illustration of a separable curve family.
Figure 6A:
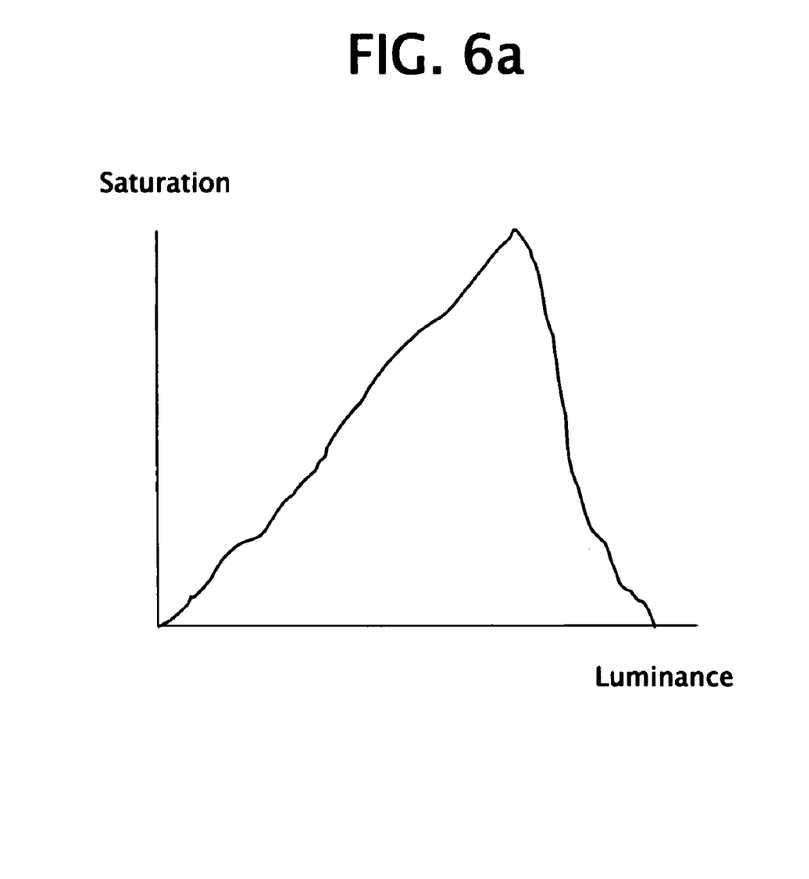
FIGS. 6*a* and 6*b* are illustrations of different curve shapes that may be used for the separable curve families.
Figure 6B:
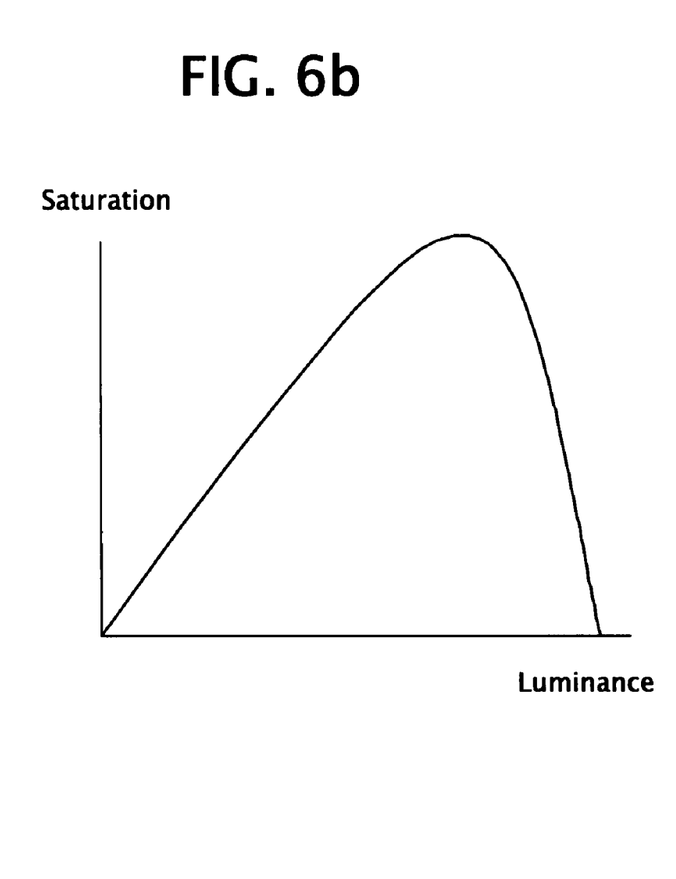

Additional reference is made to FIGS. 5 and 6a-6b. FIG. 5 illustrates an example of a separable curve family. All curves of the curve family are scaled versions of the same general shape. Scaling is dictated by the parameter t. The shapes in a family may vary for each hue.

The separable equation allows for simple computations, even with arbitrarily complex shapes $q(L)$. An example of a complex shape is illustrated in FIG. 6a, and an example of a more standard shape is illustrated in FIG. 6b.

There are various ways of implementing the curves in hardware. As a first example, curve traversals for a predetermined grid of input colors may be pre-computed, and the pre-computed values may be stored in a multi-dimensional lookup table. Saturations are interpolated for input color values that do not exactly match the grid points of the lookup table.

As a second example, a combination of computation and lookup tables may be implemented. In this second example, brightness is adjusted in $YC_bC_r$ space. In $YC_bC_r$ space, saturation (s) is $s=\sqrt{C_r^2+C_b^2}$ and hue $$(h) \text{ is } h = \tan^{-1}\left(\frac{C_b}{C_r}\right).$$

Figure 7:
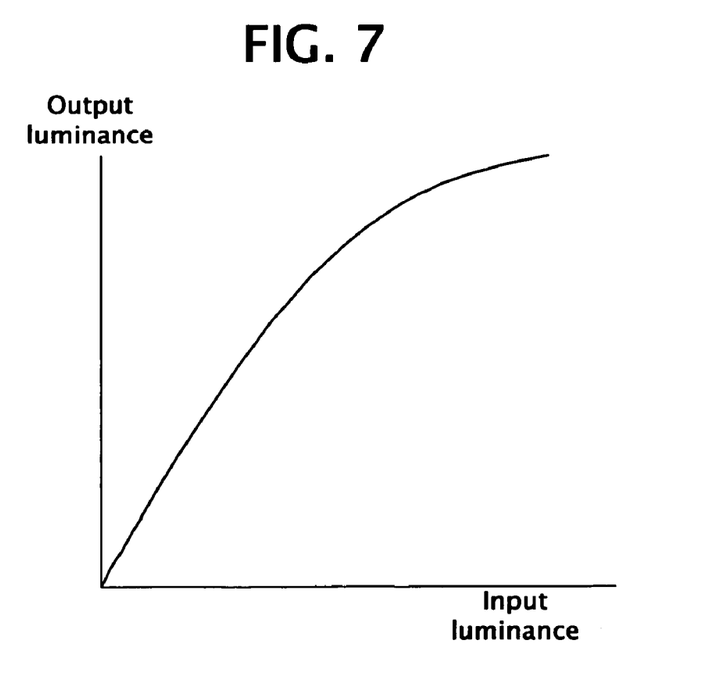
FIG. 7 is an illustration of a luminance adjustment function.

For this second example, let $L_{in}h_{in}s_{in}$ and $L_{out}h_{out}s_{out}$ represent the input and output luminances, hues and saturations. Let $f(\bullet)$ represent any monotonically increasing function for adjusting luminance (an exemplary brightness function $f(\bullet)$ is illustrated in FIG. 7). The luminance is adjusted by setting $L_{out}=f(L_{in})$. Hue is kept constant (that is, $h_o=h_i$).

Further, let $q(\bullet)$ represent a separable function for saturation, and set $\alpha=[q(f(L_{in}),h_{in})/(q(L_i,h_{in})]$. From this equation, the chrominance components can be computed as $C1_{out}=\alpha(l_i,h_i)C1_{in}$ and $C2_{out}=\alpha(l_i,h_i)C2_{in}$. It follows that the output saturation ($s_{out}$) is $s_{out}=\alpha(L_{in},h_{in})s_{in}$.

If the curve families are based on a separable equation for saturation, the method can be implemented very efficiently in hardware. The brightness function $f(\bullet)$ can be implemented using a lookup table. The function $a(\bullet)$ can also be pre-computed and stored in a lookup table. If $q(\bullet)$ is not a function of hue, the function $\alpha(\bullet)$ can be implemented with a single 1-D lookup table. However, there is not as much control over the saturation adjustments of the different hues. If $\alpha(\bullet)$ is a function of hue, the function $\alpha(\bullet)$ can be implemented with a number of lookup tables for predetermined hues, and interpolation can be used for intermediate hues. The use of separable functions makes the method fast to perform, and reduces memory and computational requirements.

Reference is once again made to FIG. 1. At block 130, the adjusted image is post-processed. The type of processing is platform specific. The post-processing may include converting the adjusted image to the color space of a rendering device. For example, the colors would be converted to CMYK color space of a printer, or to RGB color space of a display.

The method can be performed in an image rendering device. In the alternative, the method can be performed in a standalone machine (e.g., a computer), and the adjusted images could be sent to an image rendering device for print or display. In the computer, the brightness could be adjusted by a standalone program; or the brightness could be adjusted by a larger program, such as Adobe Photoshop®.

Figure 8:
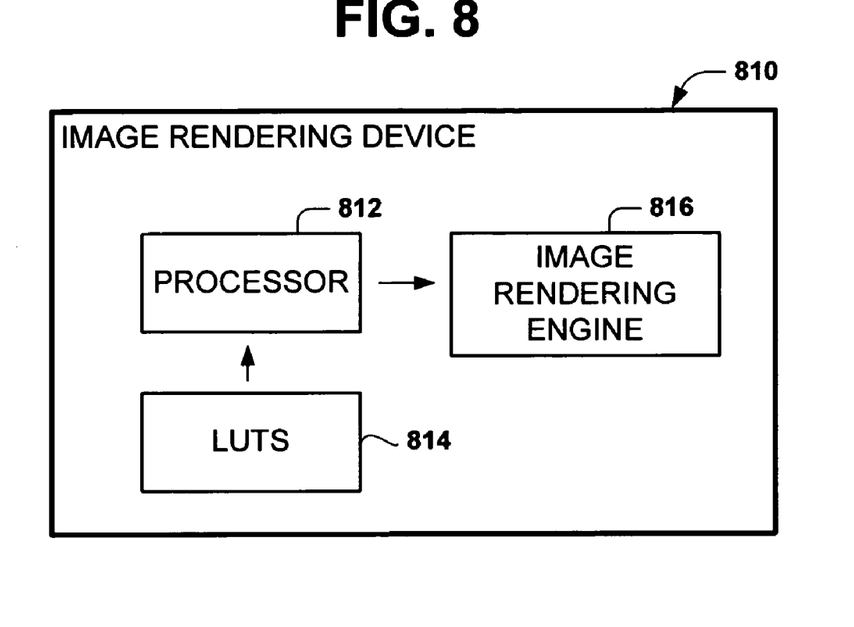
FIG. 8 is an illustration of an apparatus according to an embodiment of the present invention.

Reference is made to FIG. 8, which illustrates an exemplary image rendering device 810. The image rendering device 810 includes a processor 812 (e.g., an ASIC, a DSP) having a pipeline that works in luminance-chrominance space. The processor 812 automatically adjusts brightness in luminance-chrominance space in response to an input image and user inputs for brightness adjustment. The processor 812 includes lookup tables 814 for storing discrete values of the luminance function, and either values of saturation functions, or values of alpha. The image rendering device 810 also includes an image rendering engine 816 (e.g., a print engine, an LCD display, a light value), which displays an output of the pipeline.

The pipeline of the image rendering device 810 is platform-specific. As a first example, the image rendering device 810 is a digital television having a processor 812 with a pipeline that receives an MPEG video stream. Since MPEG is YCC-based, the processor pipeline of the digital television would work in luminance-chrominance space.

As a second example, the image rendering device 810 is a digital printer having a processor 812 with a pipeline that receives JPEG images directly from a digital camera. Since JPEG images are YCC-based, the processor pipeline of the printer would work in luminance-chrominance space.

As a third example, the image rendering device 810 is a digital television having a processor 812 with a pipeline that receives JPEG images and MPEG video directly from a computer. To process these inputs, the processor pipeline of the digital television would work in luminance-chrominance space.

Figure 9:
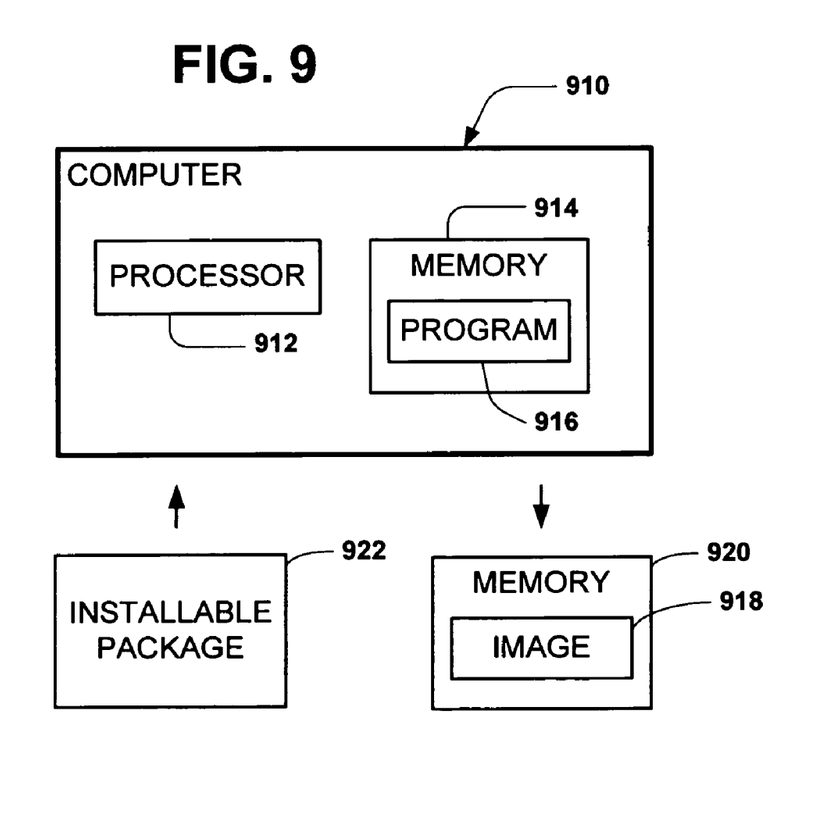
FIG. 9 is an illustration of an apparatus according to an embodiment of the present invention.

Reference is now made to FIG. 9, which illustrates a computer 910 for adjusting image brightness in luminance-chrominance space. The computer 910 includes a general purpose processor 912 and memory 914. The memory 914 stores a program 916 that, when executed, causes the processor 912 to concurrently adjust luminance and saturation of a plurality of pixels in a digital image, without changing hue of the pixels. The computer 910 can display an adjusted image on a video display, send an adjusted image to another machine (e.g., a server for storage, a display device for display), store an adjusted image 918 on a removable medium 920, etc.

The program 916 can be distributed to the computer 910 in a variety of ways. For example, an installable package 922 can be distributed to the computer 910 via a removable memory 922 (e.g., a DVD or CD Rom), via a network as an application download or as a web browser plug-in.

Although several specific embodiments of the present invention have been described and illustrated, the present invention is not limited to the specific forms or arrangements of parts so described and illustrated. Instead, the present invention is construed according to the following claims.

The invention claimed is:

1. A method of adjusting brightness of a plurality of pixels in a digital image directly in a luminance-chrominance space, the method comprising:
   selecting a curve family from a plurality of curve families based on an input hue, each curve family including a plurality of curves that relate luminance to saturation;
   selecting a curve from the selected curve family based on an input luminance and input saturation;
   concurrently adjusting the input luminance and the input saturation based on the selected curve without changing hue of the pixels.

2. The method of claim 1, wherein the input saturation is adjusted to compensate for the adjustment to the input luminance.

3. The method of claim 1, wherein the input luminance and input saturation are adjusted along a trajectory of the selected curve.

4. The method of claim 3, wherein the selected curve has a shape that allows control over the saturation change as a function of hue.

5. The method of claim 3, wherein concurrently adjusting the input luminance and input saturation includes adjusting the input luminance, and using the selected curve and the adjusted input luminance to find an adjusted saturation.

6. The method of claim 1, wherein the curves in each curve family intersect only at black and white points.

7. The method of claim 1, wherein the selected curve family is given by the function $q(L,t)$.

8. The method of claim 7, wherein the function $q(L,t)$ is separable, wherein all curves in the family have the shape $q(L)$, and wherein the selected curve is $t*q(L)$.

9. The method of claim 8, wherein adjusting the input luminance and input saturation includes accessing precomputed ratios of saturation to luminance at different input luminances; and using the accessed ratios to scale the input saturation.

10. A processor for adjusting brightness of a digital image according to the method of claim 1.

11. An article for a processor, the article comprising memory encoded with data for causing the processor to adjust brightness of a digital image according to the method of claim 1.

12. An article comprising memory encoded with an image that was processed according to the method of claim 1.

13. Apparatus comprising a processor for adjusting brightness of a plurality of pixels of a digital image directly in a luminance-chrominance space, the processor configured to select a curve family from a plurality of curve families based on an input hue, each curve family including a plurality of curves that relate luminance to saturation, the processor configured to select a curve from the selected curve family based on an input luminance and input saturation, and concurrently adjusting the input luminance and the input saturation based on the selected curve without changing hue of the pixels.

14. The apparatus of claim 13, further comprising memory for storing curve information relating luminance to chrominance; and wherein the processor adjusts the input luminance and input saturation along a trajectory of the selected curve.

15. The apparatus of claim 14, wherein the processor adjusts the input luminance, and then uses the curve information and the adjusted input luminance to find an adjusted saturation.

16. The apparatus of claim 13, wherein the curves in each curve family describe saturation as a function $q(L,t)$.

17. The apparatus of claim 16, wherein the function is separable.

18. The apparatus of claim 17, further comprising lookup tables for storing precomputed ratios of saturation to luminance at different input luminances.

19. The apparatus of 13, wherein the processor includes a pipeline that works in luminance-chrominance space, the processor adjusting the image brightness in the pipeline.

20. The apparatus of claim 13, further comprising an image rendering engine for rendering images processed in the pipeline.

21. Apparatus comprising:
   means for accessing a plurality of pixels in a digital image in luminance-chrominance space;

means for selecting a curve family from a plurality of curve families based on an input hue, each curve family including a plurality of curves that relate luminance to saturation;

means for selecting a curve from the selected curve family based on an input luminance and input saturation; and means for concurrently adjusting the input luminance and the input saturation based on the selected curve without changing hue of the pixels.

22. An article for a processor, the article comprising memory encoded with data for causing the processor to select a curve family from a plurality of curve families based on an input hue, each curve family including a plurality of curves that relate luminance to saturation, select a curve from the selected curve family based on an input luminance and input saturation, and concurrently adjust the input luminance and the input saturation of pixels in a digital image without changing hue of the pixels.

* * * * *

UNITED STATES PATENT AND TRADEMARK OFFICE
CERTIFICATE OF CORRECTION

PATENT NO. : 7,423,696 B2
APPLICATION NO. : 11/031825
DATED : September 9, 2008
INVENTOR(S) : Ramin Samadani et al.

It is certified that error appears in the above-identified patent and that said Letters Patent is hereby corrected as shown below:

In column 4, line 41, delete "$(q(L_i,h_{in})$" and insert -- $(q(L_{in},h_{in}))$ --, therefor.

In column 4, line 48, delete "$a(\cdot)$" and insert -- $\alpha(\cdot)$ --, therefor.

In column 6, line 42, in Claim 13, delete "adjusting" and insert -- adjust --, therefor.

In column 6, line 59, in Claim 19, after "apparatus of" insert -- claim --.

In column 6, line 62, in Claim 20, delete "claim 13" and insert -- claim 19 --, therefor.

Signed and Sealed this

Thirteenth Day of January, 2009

JON W. DUDAS
*Director of the United States Patent and Trademark Office*